(12) United States Patent
Aoki

(10) Patent No.: US 10,381,964 B2
(45) Date of Patent: Aug. 13, 2019

(54) MOTOR DRIVING CONTROL DEVICE AND MOTOR DRIVING CONTROL METHOD

(71) Applicant: Minebea Mitsumi Inc., Nagano (JP)

(72) Inventor: Masato Aoki, Iwata (JP)

(73) Assignee: MINEBEA MITSUMI INC., Nagano (JP)

( * ) Notice: Subject to any disclaimer, the term of this patent is extended or adjusted under 35 U.S.C. 154(b) by 31 days.

(21) Appl. No.: 15/890,622

(22) Filed: Feb. 7, 2018

(65) Prior Publication Data

US 2018/0234042 A1 Aug. 16, 2018

(30) Foreign Application Priority Data

Feb. 14, 2017 (JP) .................................. 2017-025307

(51) Int. Cl.
| | |
|---|---|
| *H02K 21/12* | (2006.01) |
| *H02P 6/185* | (2016.01) |
| *H02P 6/22* | (2006.01) |
| *H02P 6/16* | (2016.01) |

(52) U.S. Cl.
CPC ............. *H02P 6/185* (2013.01); *H02P 6/16* (2013.01); *H02P 6/22* (2013.01)

(58) Field of Classification Search
CPC .... H02P 6/185; H02P 6/16; H02P 6/22; H02P 6/153
USPC ....... 310/156.05, 68 B; 318/400.1, 439, 138, 318/721, 254, 600–605
See application file for complete search history.

(56) References Cited

U.S. PATENT DOCUMENTS 5,850,130 A * 12/1998 Fujisaki .................. C22C 1/02
318/400.2
2008/0100255 A1 5/2008 Tse
(Continued)

FOREIGN PATENT DOCUMENTS

| JP | 2001-327187 A | 11/2001 |
|---|---|---|
| JP | 2002-281780 A | 9/2002 |

(Continued)

OTHER PUBLICATIONS

Notice of Reasons for Refusal dated Jun. 24, 2019 for corresponding Japanese Application No. 2017-025307.

*Primary Examiner* — Thanh Lam
(74) *Attorney, Agent, or Firm* — Pearne & Gordon LLP

(57) ABSTRACT

There is provided a motor driving control device and a motor driving control method capable of quickly activating a motor. The motor driving control device comprises a motor driving unit, a control circuit unit and a position detector. The motor driving unit selectively energizes coils Lu, Lv, Lw of a plurality of phases of the motor. The control circuit unit outputs a driving control signal C1 to the motor driving unit to switch, in a predetermined order, an energization phase of the coils Lu, Lv, Lw of the plurality of phases to be energized by the motor driving unit. The position detector outputs a position signal corresponding to a position of a rotor of the motor. The control circuit unit adjusts the energization phase based on the position signal when the motor is activated, thereby matching variation timing of a phase of the position signal and the energization phase with each other, and outputs the driving control signal C1 according to a period of the position signal after the activation of the motor.

6 Claims, 13 Drawing Sheets

(56) References Cited

U.S. PATENT DOCUMENTS

| | | | | |
|---|---|---|---|---|
| 2012/0217907 A1* | 8/2012 | Sakaguchi | ............... | H02P 6/26 |
| | | | | 318/400.1 |
| 2013/0328510 A1* | 12/2013 | Sato | ......................... | H02P 6/06 |
| | | | | 318/400.04 |
| 2014/0139153 A1* | 5/2014 | Aoki | ....................... | H02P 6/153 |
| | | | | 318/400.1 |
| 2015/0054437 A1* | 2/2015 | Oomura | .................... | H02P 6/28 |
| | | | | 318/400.06 |
| 2017/0155346 A1* | 6/2017 | Kaidu | ..................... | H02P 6/182 |

FOREIGN PATENT DOCUMENTS

| | | |
|---|---|---|
| JP | 2004-140962 A | 5/2004 |
| JP | 2008-289248 A | 11/2008 |
| JP | 2013-081320 A | 5/2013 |

* cited by examiner

| | ENERGIZATION TIME [ms] FOR ELECTRICAL ANGLE OF 60 DEGREES |
|---|---|
| INITIAL | 32.8 |
| 1 | 24.6 |
| 2 | 18.4 |
| 3 | 13.8 |
| 4 | 10.4 |
| 5 | 7.8 |
| 6 | 5.8 |
| 7 | 4.4 |
| 8 | 3.3 |

FIG.10

MOTOR DRIVING CONTROL DEVICE AND MOTOR DRIVING CONTROL METHOD

CROSS REFERENCE TO RELATED APPLICATIONS

This application claims the benefit of Japanese Patent Application No. 2017-025307, filed Feb. 14, 2017 which is hereby incorporated by reference in its entirety.

BACKGROUND

Technical Field

The present disclosure relates to a motor driving control device and a motor driving control method, and particularly to a motor driving control device and a motor driving control method capable of performing so-called single-sensor driving.

Background

A device for driving a motor by so-called single-sensor driving is known as a motor driving control device for driving a motor. For example, a device for driving a motor by using only one hall sensor for detecting a magnetic pole position of the motor is known.

When the motor is driven by the single-sensor driving, it is impossible to specify the magnetic pole position unlike a case where plural sensors are used. Therefore, a method of performing rotor-lock before activation control is started and then starting activation is adopted. The rotor-lock is a control operation of positioning a rotor at a predetermined position.

The configuration of a fan motor driving control device using only one magnetic pole position detecting sensor for a rotor is described in Patent Document 1 (JP2004-140962A). In this fan motor driving control device is performed braking control for positioning a rotor at a predetermined position by performing PWM energization on one switching element on one side of a positive voltage side and a negative voltage side of an inverter circuit and two switching elements on the other side of the positive and negative voltage sides based on an output signal of a magnetic pole position detecting sensor before a brushless motor is activated.

It takes time to perform a control operation of positioning a rotor at a predetermined position as described above. That is, it takes time until a motor has been stationarily driven from activation of the motor.

SUMMARY

The present disclosure is related to providing a motor driving control device and a motor driving control method capable of quickly activating a motor.

According to one aspect of the present disclosure, a motor driving control device comprises: a motor driving unit for selectively energizing coils of a plurality of phases of a motor; a control circuit unit for outputting a driving control signal to the motor driving unit to switch, in a predetermined order, an energization phase of the coils of the plurality of phases to be energized by the motor driving unit; and a position detector for outputting a position signal corresponding to a position of a rotor of the motor, wherein the control circuit unit adjusts the energization phase based on the position signal when the motor is activated, thereby matching variation timing of a phase of the position signal and the energization phase with each other, and outputs the driving control signal according to a period of the position signal after the activation of the motor.

Preferably, when the motor is activated, the control circuit unit quickly switches the energization phase in the predetermined order to adjust the energization phase.

Preferably, when the motor is activated, the control circuit unit starts a switching operation of the energization phase in a period longer than the period of the position signal, and then shortens the period of performing the switching operation of the energization phase every time a predetermined condition is satisfied Preferably, when the motor is activated, the control circuit unit stops an operation for shortening the period of performing the switching operation of the energization phase when the variation timing of the phase of the position signal and the energization phase are matched with each other.

Preferably, when the variation timing of the phase of the position signal and the energization phase are not matched with each other after the activation of the motor, the control circuit unit adjusts the energization phase based on the position signal to match the variation timing of the phase of the position signal and the energization phase with each other.

According to another aspect of the present disclosure, a method for controlling driving of a motor, wherein the motor includes a motor driving unit for selectively energizing coils of a plurality of phases of a motor, a control circuit unit for outputting a driving control signal to the motor driving unit to switch, in a predetermined order, an energization phase of the coils of the plurality of phases to be energized by the motor driving unit, and a position detector for outputting a position signal corresponding to a position of a rotor of the motor, wherein the method comprises: a first step of adjusting the energization phase based on the position signal to match variation timing of a phase of the position signal and the energization phase with each other when the motor is activated; and a second step of outputting the driving control signal according to a period of the position signal after the activation of the motor in the first step.

According to the present disclosure, a motor driving control device and a motor driving control method capable of quickly activating a motor can be provided.

BRIEF DESCRIPTION OF THE DRAWINGS

FIG. 10 is a diagram showing an example of variation of the period of each energization phase.

DETAILED DESCRIPTION

A motor driving control device according to an embodiment of the present disclosure will be described.

Embodiment

Figure 1:
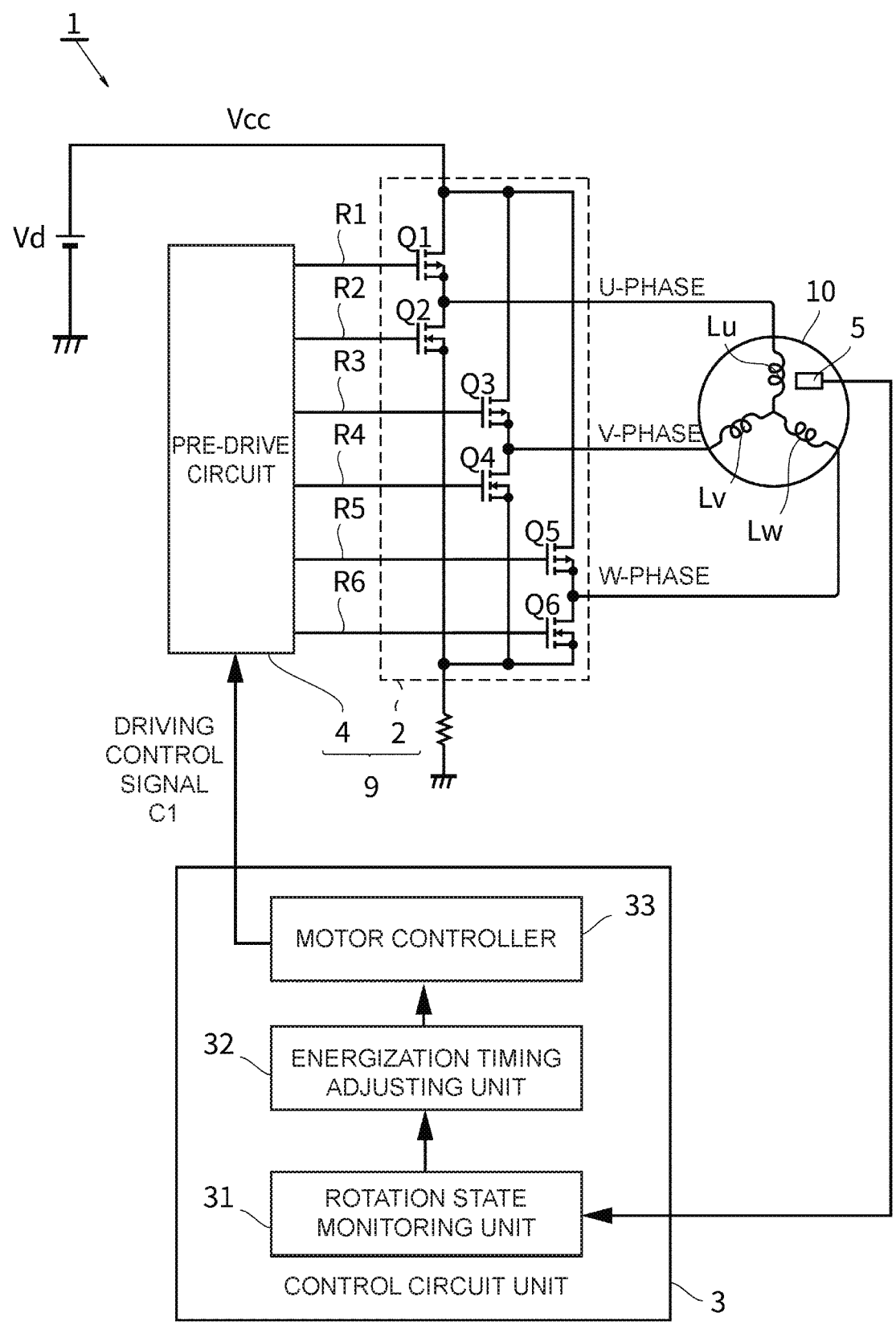
FIG. 1 is a diagram showing the configuration of a motor driving control device according to an embodiment of the present disclosure.

FIG. 1 is a diagram showing the configuration of a motor driving control device 1 according to an embodiment of the present disclosure.

As shown in FIG. 1, a motor driving control device 1 includes a control circuit unit 3, a position detector 5, and a motor driving unit 9. The motor driving control device 1 supplies driving power to a synchronous motor (an example of a motor) 10 to drive the synchronous motor 10. The synchronous motor 10 according to the present embodiment is a three-phase motor having coils Lu, Lv, Lw of U-phase, V-phase and W-phase, respectively.

The position detector 5 outputs a position signal corresponding to the position of a rotor of the synchronous motor 10. The position detector 5 is a magnetic sensor such as a hall element or a hall IC, for example, and a hall signal is output as the position signal. The position signal output from the position detector 5 is input to the control circuit unit 3. The position detector 5 detects the position of the rotor at one place of the synchronous motor 10, and outputs the position signal. For example, one position detector 5 is provided for the coil Lu of U-phase. During one rotation of the rotor, the position signal changes from a low level to a high level (rises; rising edge) when the rotor passes a predetermined position (when the rotor is located at a first rotational position), and the position signal changes from the high level to the low level (falls; falling edge) when the rotor passes a predetermined position different from the foregoing predetermined position (when the rotor is located at a second position). The position signal is a signal set periodically to the high level or the low level according to the rotation of the rotor. A signal repeating the high level and the low level periodically may be directly output as a position signal from the position detector 5, or an analog position signal output from the position detector 5 may be input to the control circuit unit 3 and then converted to a signal set periodically to the high level or the low level (in the following description, the signal to which the analog position signal has been converted as described above is also called a "position signal").

In the present embodiment, only one position detector 5 is provided. That is, a position signal detected at only one place of the synchronous motor 10 is input to the control circuit unit 3. A plurality of position detectors 5 may be provided, and a position signal output from only one of the position detectors 5 may be input to the control circuit unit 3 and then used. That is, in the present embodiment, the position signal output from one position detector 5 is input to the control circuit unit 3. The motor driving control device 1 drives the synchronous motor 10 by the single-sensor method using only one position detector 5 for detecting the position of the rotor.

The motor driving unit 9 selectively energizes the coils Lu, Lv and Lw of plural phases of the synchronous motor 10. The motor driving unit 9 has an inverter circuit 2 and a pre-drive circuit 4. A driving control signal C1 output from the control circuit unit 3 is input to the motor driving unit 9.

The inverter circuit 2 selectively energizes the coils Lu, Lv and Lw of three phases of the synchronous motor 10 based on driving signals R1 to R6 output from the pre-drive circuit 4 to control the rotation of the synchronous motor 10.

In the present embodiment, the inverter circuit 2 has six switching elements Q1 to Q6 for supplying driving current to the respective coils Lu, Lv and Lw of the synchronous motor 10. The switching elements Q1, Q3 and Q5 are high-side switching elements each comprising MOSFET (Metal-Oxide-Semiconductor Field Effect Transistor) of P-channel arranged on the positive electrode side of a DC power source Vcc. The switching elements Q2, Q4 and Q6 are low-side switching elements each comprising MOSFET of N-channel arranged on the negative electrode side of the DC power source Vcc. The two switching elements Q1 and Q2 are connected to each other in series and the same is true of the combination of the switching elements Q3 and Q4 and the combination of the switching elements Q5 and Q6. These three pairs of series circuits are connected to one another in parallel to configure a bridge circuit. The connection point between the switching elements Q1 and Q2 is connected to the coil Lu of U-phase, the connection point between the switching elements Q3 and Q4 is connected to the coil Lv of V-phase, and the connection point between the switching elements Q5 and Q6 is connected to the coil Lw of W-phase.

The pre-drive circuit 4 has plural output terminals to be connected to the respective gate terminals of the six switching elements Q1 to Q6 of the inverter circuit 2. The driving signals R1 to R6 are output from the respective output terminals to control ON/OFF operation of the switching elements Q1 to Q6. A driving control signal C1 output from the control circuit unit 3 is input to the pre-drive circuit 4. The pre-drive circuit 4 outputs the drive signals R1 to R6 based on the driving control signal C1 to operate the inverter circuit 2. That is, the inverter circuit 2 selectively energizes the coils Lu, Lv, Lw of the respective phases of the synchronous motor 10 based on the driving control signal C1.

The control circuit unit 3 outputs the driving control signal C1 to the motor driving unit 9, whereby the energization phases (energization patterns) of the coils Lu, Lv, Lw of the plural phases to be energized by the motor driving unit 9 are switched in a predetermined order. The control circuit unit 3 has a rotation state monitoring unit 31, an energization timing adjusting unit 32, and a motor controller 33. The control circuit unit 3 may be configured, for example by using DSP (Digital Signal Processor), FPGA (Field Programmable Gate Array), or a programmable device such as a microcomputer.

The position signal is input to the rotation state monitoring unit 31. The rotation state monitoring unit 31 monitors the rotation state of the synchronous motor 10 based on the position signal.

The energization timing adjusting unit 32 adjusts the energization timing of the coils Lu, Lv, Lw based on the monitoring result of the rotation state monitoring unit 31.

The motor controller 33 generates the driving control signal C1 based on the adjustment result of the energization timing adjusting unit 32. The generated driving control signal C1 is output to the motor driving unit 9.

Here, the basic operation of the motor driving control device 1 will be briefly described.

Figure 2:
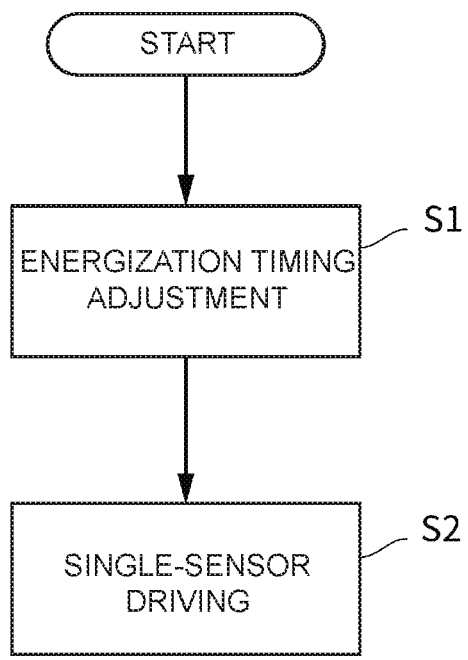
FIG. 2 is a flowchart showing the basic operation of the motor driving control device.

FIG. 2 is a flowchart showing the basic operation of the motor driving control device 1.

As shown in FIG. 2, the motor driving control device 1 generally performs the energization timing adjustment (step S1) and the single-sensor driving (step S2).

The motor driving control device 1 performs forced commutation on the synchronous motor 10 when the synchronous motor 10 is activated. When the synchronous motor 10 is activated, the motor driving control device 1 performs the energization timing adjustment (step S1: first step). That is, the control circuit unit 3 adjusts the energization phase based on the position signal at the activation time of the synchronous motor 10, thereby matching the variation timing of the phase of the position signal and the energization phase with each other. That is, the control circuit unit 3 synchronizes the rotation of the rotor of the synchronous motor 10 with the energization timing of each energization phase, and activates the synchronous motor 10.

When the synchronous motor 10 is activated in the first step, the motor driving control device 1 performs the single-sensor driving (normal driving of the synchronous motor 10 by the single-sensor method) (step S2: second step). That is, the control circuit unit 3 outputs the driving control signal C1 according to the period of the position signal (starts the normal driving) after the activation of the synchronous motor 10, whereby the control circuit unit 3 switches the energization phases of the coils Lu, Lv, Lw to be energized by the motor driving unit 9 in a predetermined order.

Next, the relationship between the energization phase and the position signal in the present embodiment will be described.

Figure 3:
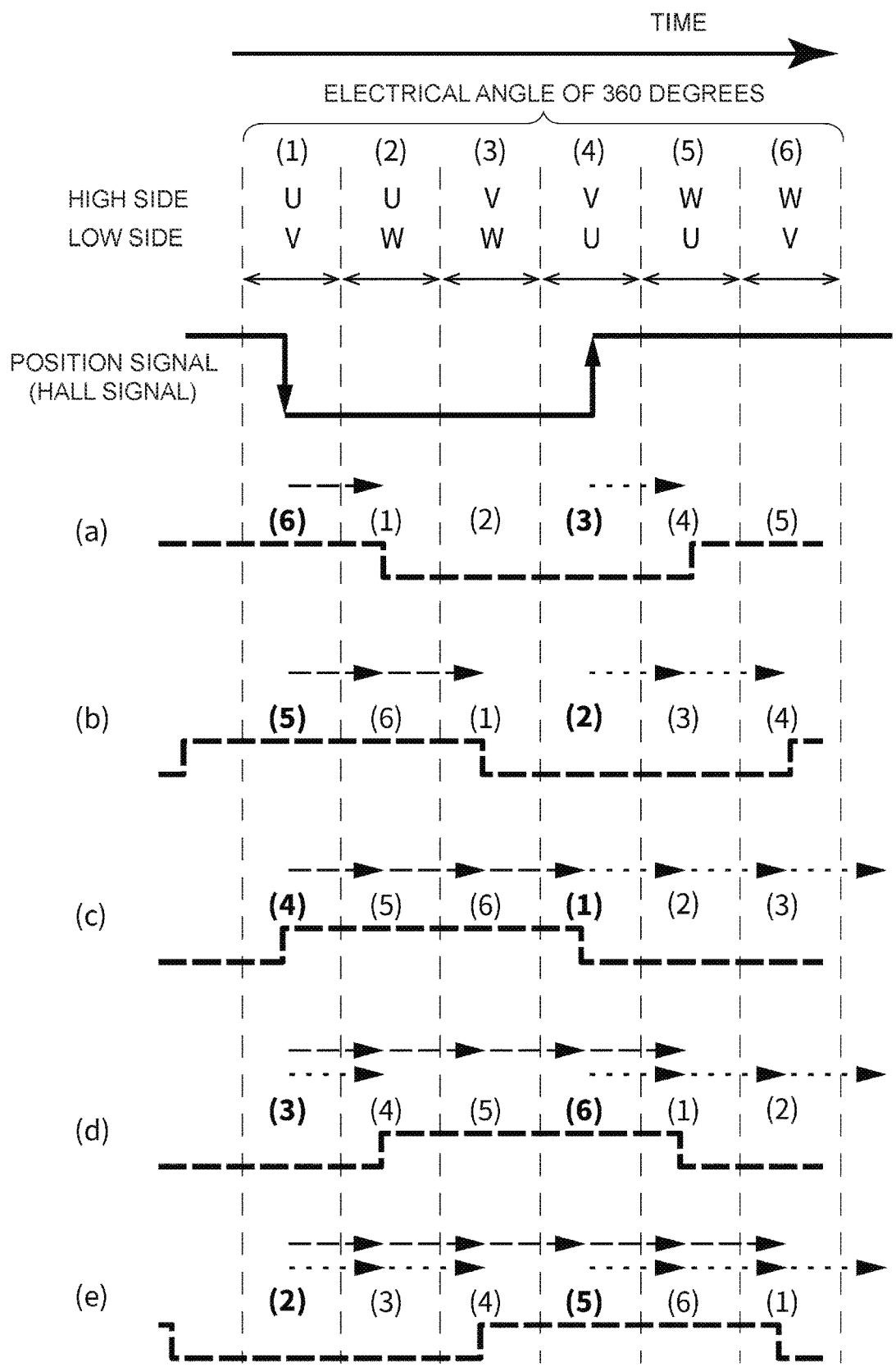
FIG. 3 is a diagram showing the relationship between an energization phase and a position signal in the present embodiment.

FIG. 3 is a diagram showing the relationship between the energization phase and the position signal in the present embodiment.

FIG. 3 shows the transition of the energization phases and the waveforms of the position signal during the period when the electrical angle of the synchronous motor 10 reaches 360 degrees. A position signal represented by a solid line at the upper stage represents the relationship with the energization phase expected from the rotational position of the rotor.

In the present embodiment, the energization phases contain the following six types of energization phases (six energization patterns), that is, first to sixth energization phases (1) to (6). The combination of the high side and the low side corresponds to U-phase and V-phase in the first energization phase (1), the combination of the high side and the low side corresponds to U-phase and W-phase in the second energization phase (2), the combination of the high side and the low side corresponds to V-phase and W-phase in the third energization phase (3), the combination of the high side and the low side corresponds to V-phase and U-phase in the fourth energization phase (4), the combination of the high side and the low side corresponds to W-phase and U-phase in the fifth energization phase (5), and the combination of the high side and the low side corresponds to W-phase and V-phase in the sixth energization phase (6). The control circuit unit 3 outputs the driving control signal C1 to switch the energization phases of the coils Lu, Lv, Lw to be energized by the motor driving unit 9 from the energization phase (1) till the energization phase (6) in the above-mentioned order. The switching of the energization phase is performed at an interval of 60 degrees in an electrical angle.

In the present embodiment, as shown in FIG. 3, in the case where the motor is driven with an energization phase expected from the rotational position of the rotor, the position signal falls from the high level to the low level under the first energization phase (1), and rises from the low level to the high level under the fourth energization phase (4). In other words, the rising edge of the position signal corresponds to the fourth energization phase (4), and the falling edge of the position signal corresponds to the first energization phase (1).

Here, the energization phase may be advanced or delayed with respect to the rotational position of the rotor in some cases. Such cases are shown from (a) to (e) in FIG. 3. In each of the cases (a) to (e), the position signal of the rotor as a target is represented by broken lines.

The case (a) is a case where the energization phase is delayed by one with respect to the rotational position of the rotor (the energization phase is advanced by five with respect to the rotational position of the rotor). That is, the falling edge of the position signal is located in the sixth energization phase (6), and the rising edge is located in the third energization phase (3).

The case (b) is a case where the energization phase is delayed by two with respect to the rotational position of the rotor (the energization phase is advanced by four with respect to the rotational position of the rotor). That is, the falling edge of the position signal is located in the fifth energization phase (5), and the rising edge is located in the second energization phase (2).

The case (c) is a case where the energization phase is delayed by three with respect to the rotational position of the rotor (the energization phase is advanced by three with respect to the rotational position of the rotary). That is, the falling edge of the position signal is located in the fourth energization phase (4), and the rising edge is located in the first energization phase (1).

The case (d) is a case where the energization phase is delayed by four with respect to the rotational position of the rotor (the energization phase is advanced by two with respect to the rotational position of the rotor). That is, the falling edge of the position signal is located in the third energization phase (3), and the rising edge is located in the energization phase (6).

The case (e) is a case where the energization phase is delayed by five with respect to the rotational position of the rotor (the energization phase is advanced by one with respect to the rotational position of the rotor). That is, the falling edge of the position signal is located in the second energization phase (2), and the rising edge is located in the fifth energization phase (5).

Figure 4:
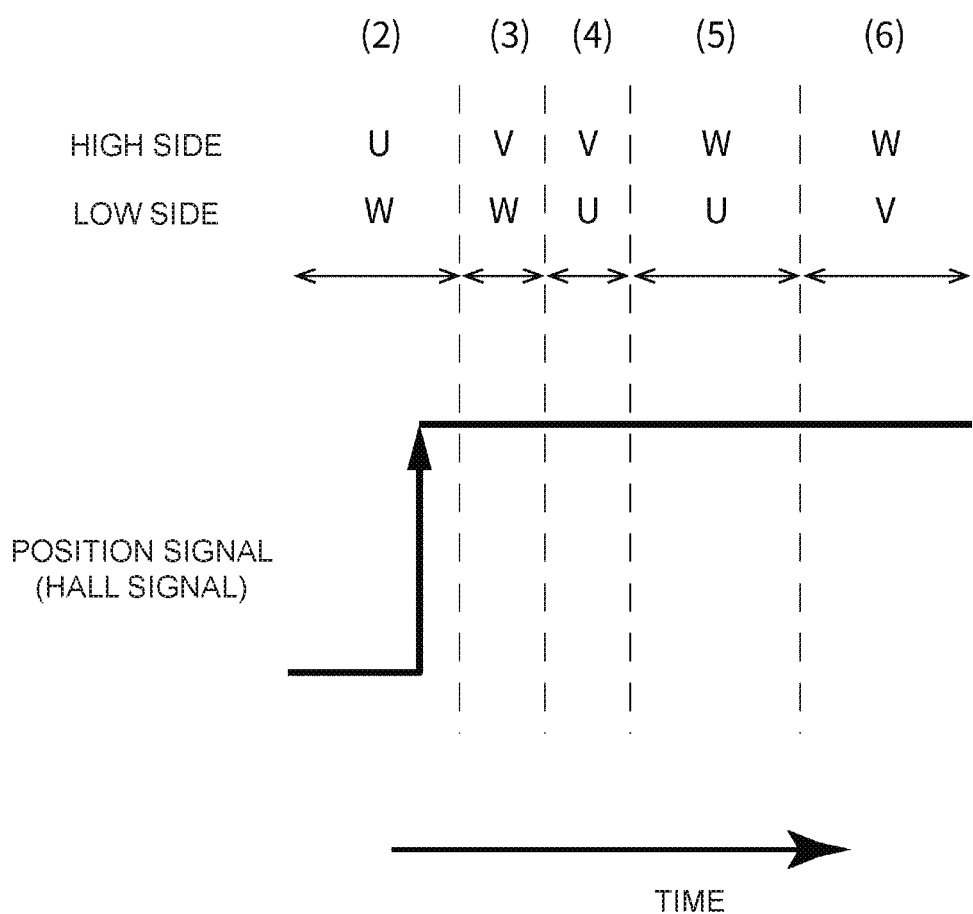
FIG. 4 is a first diagram showing a state where the phase of the energization phase is delayed with respect to the rotational position of a rotor.

FIG. 4 is a first diagram showing a state where the phase of the energization phase is delayed with respect to the rotational position of the rotor.

In FIG. 4 the rising edge of the position signal occurs in the second energization phase (2) although it should occur in the fourth energization phase (4) expected from the rotational position of the rotor. That is, this case corresponds to the case (b) shown in FIG. 3.

Figure 5:
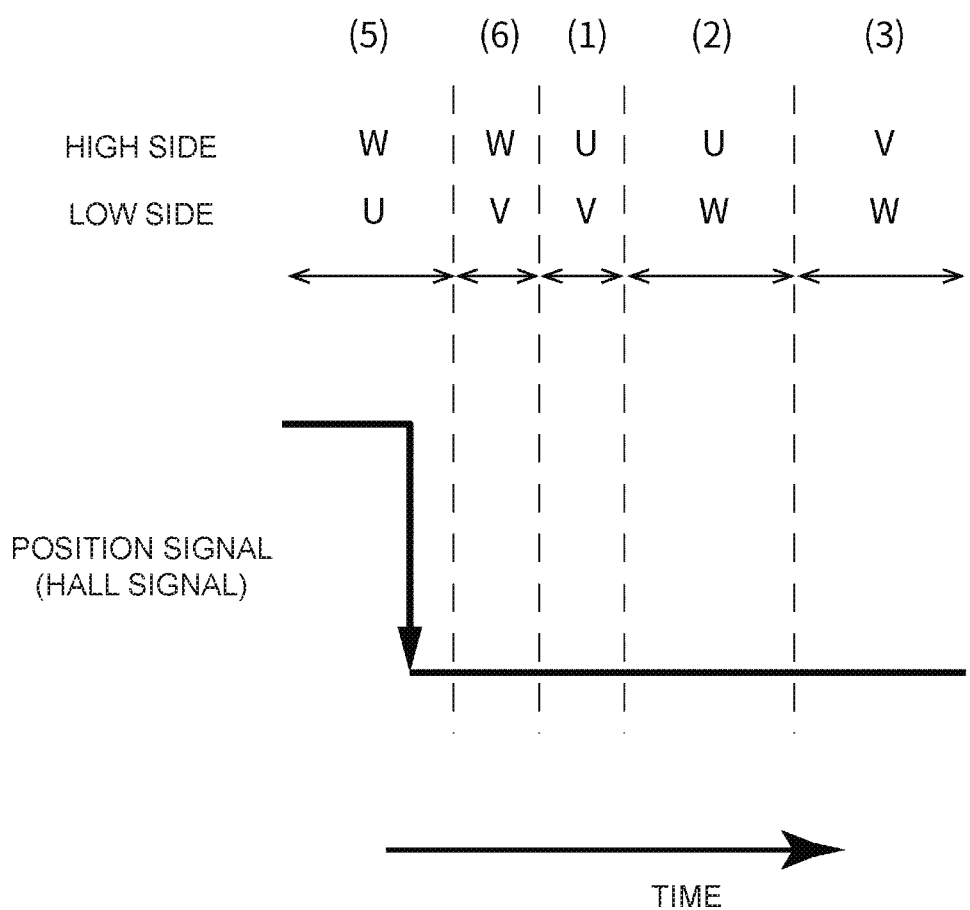
FIG. 5 is a second diagram showing a state where the phase of the energization phase is delayed with respect to the rotational position of the rotor.

FIG. 5 is a second diagram showing a state where the phase of the energization phase is delayed with respect to the rotational position of the rotor.

In FIG. 5 the falling edge of the position signal occurs in the fifth energization phase (5) although it should occur in the first energization phase (1) expected from the rotational position of the rotor. That is, this case also corresponds to the case (b) shown in FIG. 3.

As described above, a case where the phase of the position signal is shifted with respect to the phase of the energization phase, that is, a case where the energization phase is shifted with respect to the rotational position of the rotor and thus energization is not performed under an expected energization phase may occur. Particularly, in the single-sensor method as used in the present embodiment, it is impossible to accurately ascertain the state of the rotor at the activation time. Therefore, in the present embodiment, the control circuit unit 3 performs energization timing adjustment for adjusting the energization phase based on the position signal when the synchronous motor 10 is activated, thereby matching the variation timing of the phase of the position signal with the energization phase, and then outputs the driving control signal C1.

The operation of the motor driving control device 1 when the energization timing adjustment is performed will be described hereunder.

In the present embodiment, the rotation state monitoring unit 31 detects the rising timing or falling timing of the position signal as the variation timing of the phase of the position signal (also merely called "detect the rising", "detect the falling" in some cases). The energization timing adjusting unit 32 checks the energization phase at the timing when the rising or falling of the position signal is detected by the rotation state monitoring unit 31, and determines whether the checked energization timing is an expected energization phase or not.

That is, when the rising of the position signal is detected, the energization timing adjusting unit 32 determines whether the energization phase is the fourth energization phase (4) corresponding to the rising. Furthermore, when the falling of the position signal is detected, the energization timing adjusting unit 32 determines whether the energization phase is the first energization phase (1) corresponding to the falling. When the energization phase corresponds to neither the rising of the position signal nor the falling of the position signal, the energization phase is adjusted until the energization phase becomes an energization phase corresponding to the rising or falling of the position signal, that is, an energization phase suitable for performing expected energization. The motor controller 33 outputs the driving control signal C1 based on an adjustment result of the energization phase of the energization timing adjusting unit 32. The driving control signal C1 is output as described above, whereby the synchronous motor 10 is driven with the first energization phase (1) or the fourth energization phase (4), wherein the first energization phase (1) or the fourth energization phase (4) has been adjusted by the energization timing adjusting unit 32 and is matched with the rising or falling of the position signal.

In the present embodiment, the adjustment of the energization phase is performed by quickly switching the energization phase in a predetermined order when the synchronous motor 10 is activated. Specifically, the switching of the energization phase is advanced in the switching order of the energization phase as shown in FIG. 3 until the current energization phase becomes an energization phase suitable for performing expected energization, that is, an energization phase matched with the position signal.

Furthermore, the control circuit unit 3 starts the switching operation of the energization phase at a period longer than the period of the position signal when the synchronous motor 10 is activated. Subsequently, the control circuit unit 3 shortens the period of execution of the switching operation of the energization phase every time a predetermined condition is satisfied. Here, the predetermined condition may be set such that the phase of the position signal varies and the energization phase does not correspond to the variation of the phase of the position signal or the like. More specifically, the predetermined condition may be set such that the rising or falling of the position signal occurs and the energization phase at this time does not correspond to the occurring rising or falling of the position signal or the like. The operation of matching the current energization phase with the energization phase corresponding to the rising or falling of the position signal every time the rising or falling of the position signal occurs is successively performed while shortening the period of the energization phase as described above, whereby the rising or falling of the position signal and the energization phase will be finally matched with each other. As described above, when the energization phase is matched with the rising or falling of the position signal (the variation timing of the phase of the position signal and the energization phase are matched with each other) at the activation time of the synchronous motor 10, the control circuit unit 3 stops the operation of shortening the period of the switching operation of the energization phase. Then, the control circuit unit 3 finishes the energization timing adjustment, and starts the normal driving of the synchronous motor 10 based on the single-sensor method after the activation of the synchronous motor 10 (outputs the driving control signal C1 corresponding to the period of the position signal).

The operation of the motor driving control device 1 under the energization timing adjustment as described above will be described below with reference to flowcharts, etc.

Figure 6:
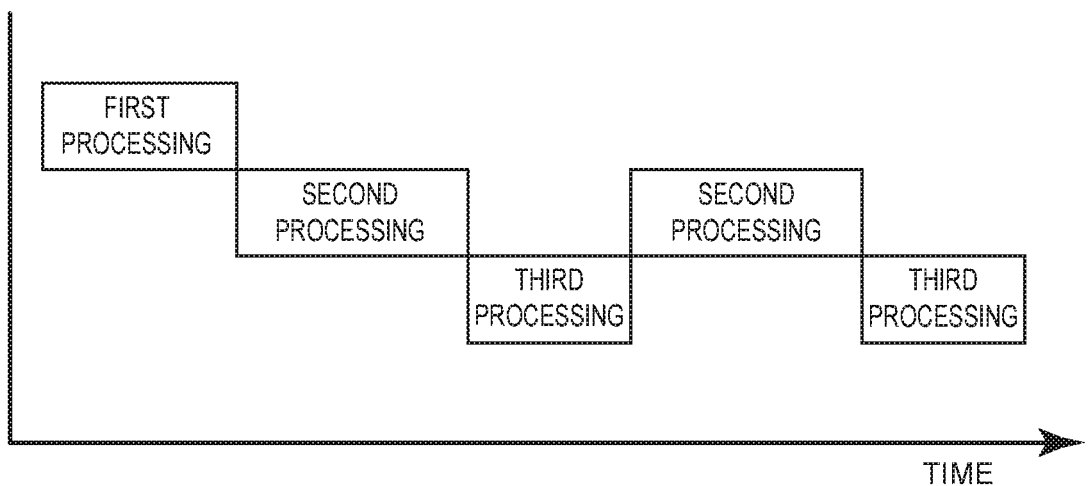
FIG. 6 is a diagram showing the operation of the motor driving control device when an energization timing is adjusted.

FIG. 6 is a diagram showing the operation of the motor driving control device 1 under the energization timing adjustment.

As shown in FIG. 6, under the energization timing adjustment, first processing to be first executed, second processing to be executed subsequently to the first processing and third processing to be inserted during the execution of the second processing are executed by the control circuit unit 3. The third processing is inserted at a timing when the phase of the position signal varies.

Figure 7:
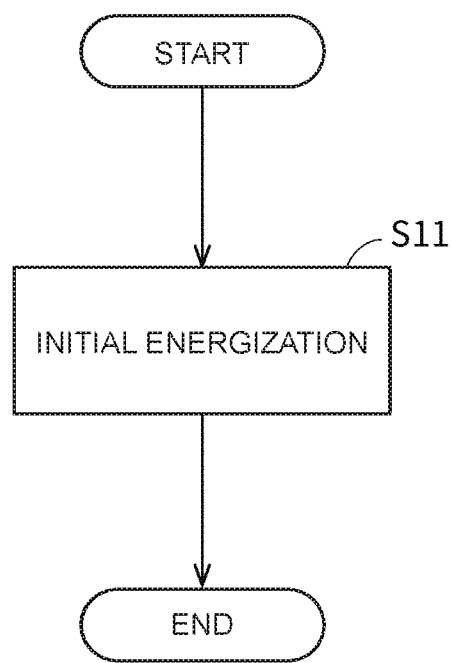
FIG. 7 is a flowchart showing first processing.

FIG. 7 is a flowchart showing the first processing.

As shown in FIG. 7, in the first processing, initial energization is performed in step S11. When the initial energization is performed, the coils of the synchronous motor 10 are energized, so that the rotor starts rotation. When the initial energization has been completed, the first processing is finished, and the processing shifts to the second processing.

Figure 8:
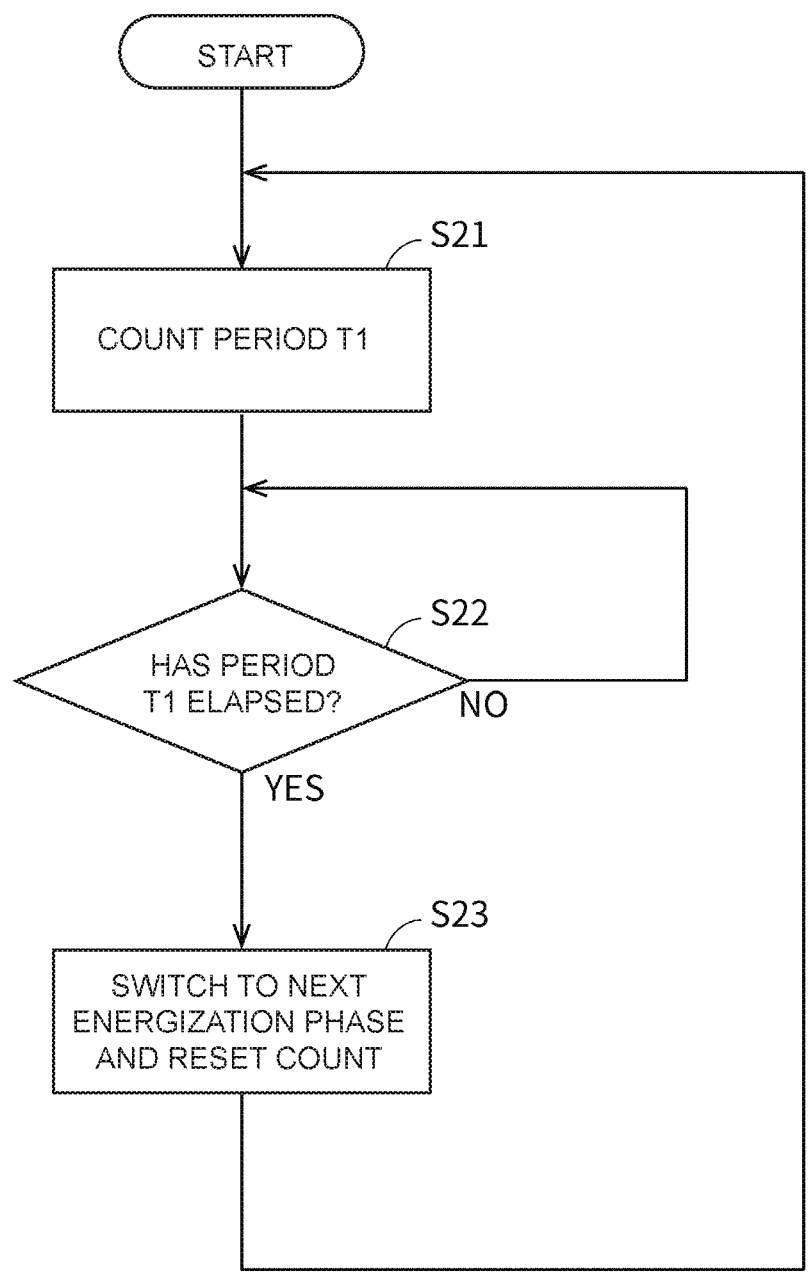
FIG. 8 is a flowchart showing second processing.

FIG. 8 is a flowchart showing the second processing.

As shown in FIG. 8, in the second processing, counting of a period T1 is performed in step S21. When the activation is started, the period T1 is set to a predetermined time (initial time) as described later. When the second processing is first executed, counting is performed from zero until the period T1 has elapsed.

In step S22, it is determined based on the counting result whether the period T1 has elapsed or not. When the period T1 has elapsed, the processing proceeds to the processing of step S23.

In step S23, the control circuit unit 3 switches the current energization phase to the next energization phase. That is, the period T1 corresponds to a time and in the time energization is performed with a single energization phase.

At this time, the control circuit unit 3 resets the count. Therefore, energization is started with a switched energization phase, and the processing from the step S21 is executed again.

When the phase of the position signal varies during execution of the second processing as described above, that is, when falling from the high level to the low level occurs in the position signal or rising from the low level to the high level occurs in the position signal, this variation is detected by the rotation state monitoring unit 31. When the variation of the phase of the position signal is detected, the third processing is executed.

Figure 9:
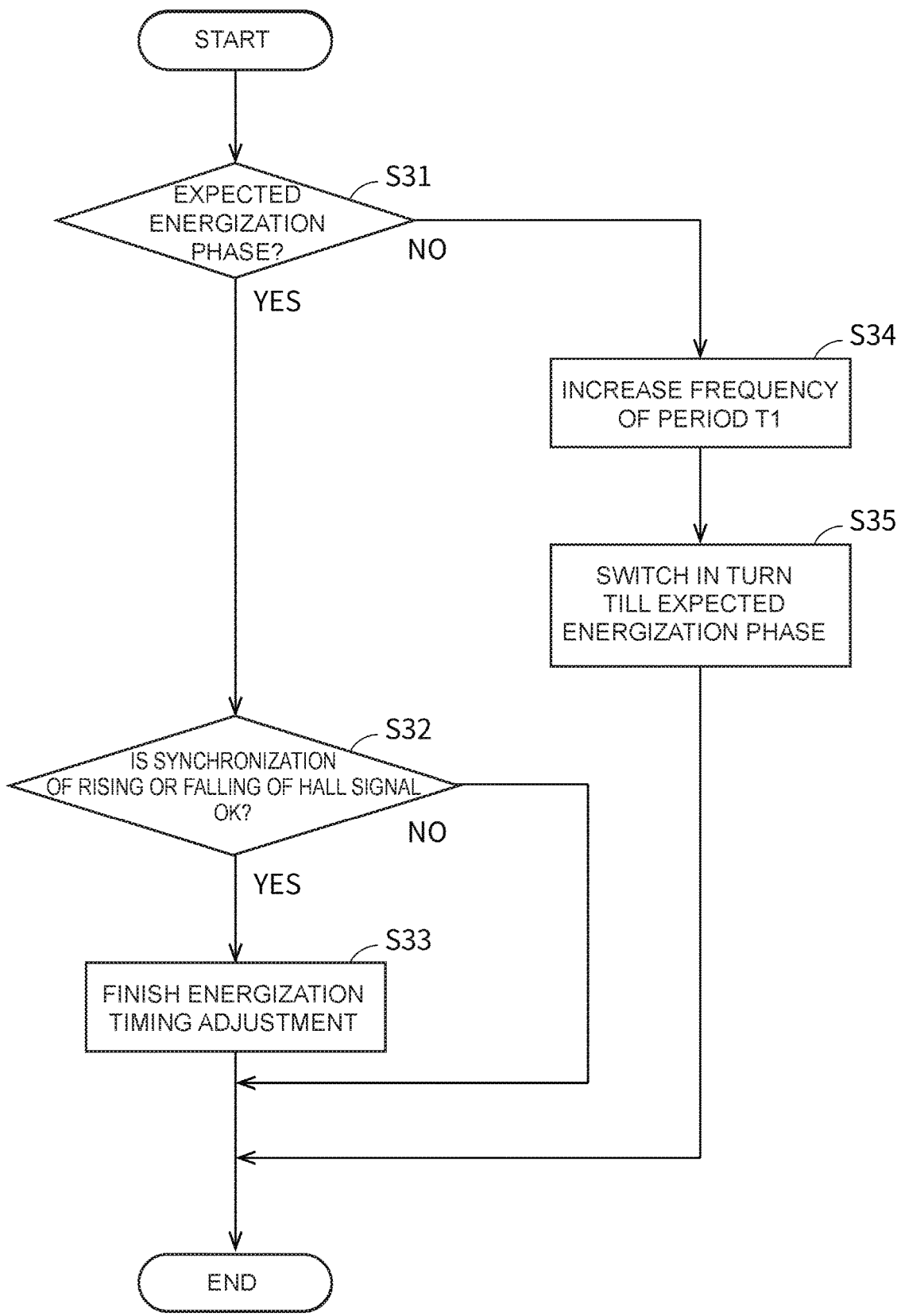
FIG. 9 is a flowchart showing third processing.

FIG. 9 is a flowchart showing the third processing.

As shown in FIG. 9, in the third processing, the control circuit unit 3 determines whether the energization phase at that time, that is, the energization phase at the time when the phase of the position signal varies is an expected energization phase in step S31. Specifically, the energization timing adjusting unit 32 determines whether the energization phase is a predetermined energization phase corresponding to the rising or falling of the position signal occurring at that time. In the present embodiment, when occurrence of the rising of the position signal is detected, it is determined whether the energization phase at that time is the fourth energization phase (4) or not. Furthermore, when occurrence of the falling of the position signal is detected, it is determined whether the energization phase at that time is the first energization phase (1) or not. When the energization phase is an expected energization phase, the processing proceeds to step S32. If the energization phase is not an expected energization phase, the processing proceeds to step S34.

In step S32, the control circuit unit 3 determines whether the rising or falling timing of the position signal is synchronized with the switching timing of the energization phase.

For example, when occurrence of the rising or falling of the position signal is detected and also the energization phase at that time is determined to be an expected energization phase, and then when occurrence of the rising or falling of the position signal is next detected and also the energization phase at that time can be also checked to be an expected energization phase, the control circuit unit 3 determines that the rising or falling timing of the position signal is synchronized with the switching timing of the energization phase. That is, as described later, the energization phase is switched when the rising or falling of the position signal occurs, and then when it can be checked that the energization phase becomes the same energization phase again after one period of the position signal from the above switching time of the energization phase, the synchronization is determined. The determination may be performed by the energization timing adjusting unit 32 when the rotation state monitoring unit 32 detects the variation of the phase of the position signal. The method of checking the synchronization is not limited to the above method. For example, in the case where it is continuously determined over a predetermined period that the energization phase is an expected energization phase when the phase of the position signal varies, the synchronization may be determined.

When the synchronization is determined in step S32, the processing proceeds to step S33. On the other hand, if asynchronization is determined, the third processing is finished, and the second processing is executed again.

In step S33, the control circuit unit 3 finishes the energization timing adjustment. As a result, the normal driving of the synchronous motor 10 by the single-sensor method after the activation of the synchronous motor 10 is started (the output of the driving control signal C1 corresponding to the period of the position signal is started).

On the other hand, when the energization phase is determined not to be an expected energization phase in step S31, the control circuit unit 3 changes the period T in step S34. Specifically, the energization timing adjusting unit 32 changes the period T1 so that the period T1 is made shorter than before (made higher in frequency than before). In the present embodiment, the amount by which the period T1 is shortened is preset.

In step S35, the control circuit unit switches the energization phase to an expected energization phase corresponding to the phase variation of the position signal detected at that time. Specifically, the energization timing adjusting unit 32 switches the current energization phase in a predetermined order till an expected energization phase.

In step S35, the energization phase can be switched till the expected energization phase by successively switching the energization phase to the next energization phase in the predetermined order at an earlier timing than usual. That is, as shown in FIG. 3, as in the case (a), when the energization phase at the detection time of the falling is the sixth energization phase (6), the energization phase is advanced by one to be switched to the first energization phase (1) (see an arrow of broken line). Furthermore, when the energization phase at the detection time of the rising is the third energization phase (3), the energization phase is advanced by one to be switched to the fourth energization phase (4) (see an arrow of dotted line). Likewise, in the case (b) the energization phase is advanced by two, in the case (c) the energization phase is advanced by three, in the case (d) the energization phase is advanced by four, and in the case (e) the energization phase is advanced by five. As a result, in each case, when the falling is detected, the energization phase is adjusted to the first energization phase (1) corresponding to the falling (see an arrow of broken line). Furthermore, when the rising is detected, the energization phase is adjusted to the fourth energization phase (4) corresponding to the rising (see an arrow of dotted line).

When the energization phase is switched, the third processing is finished, and the second processing is executed. That is, the count of the period T1 shortened in step S34 is started (step S21).

FIG. 10 is a diagram showing an example of the variation of the period of each energization phase.

In the present embodiment, the period T1 is set to a preset time. In the present embodiment, the period T1 corresponds to an energization time of one energization phase (an energization time for an electrical angle of 60 degrees). That is, as shown in FIG. 10, 32.8 milliseconds as an "initial" time is set to the period T1 when the period T1 is first set after start of the activation (in step S21 of the second processing). Subsequently, the period T1 is changed every time the above-mentioned processing of the step S34 is executed, and a time shorter than the period T1 at that time is set as the period T1. Specifically, when the above-mentioned processing of the step S34 is executed in the "initial" period T1, 24.6 milliseconds as a time of "1" shown in FIG. 10 is set to the period T1. Likewise, the period T1 is gradually changed to a shorter time every time the processing of the step S34 is executed. For example, a time of "2" is set in the period T1 of "1", a time of "3" is set in the period T1 of "2" or the like. In the present embodiment, the newly set period T1 is set to 0.75 times of the just previous period T1. The period T1 is set not to be shortened more when the period T1 becomes 3.3 milliseconds as the period T1 of "8". However, the period T1 is not limited to this setting, and it may be further shortened. Furthermore, the amount of adjusting the period T1 is not limited to the above manner.

Figure 11:
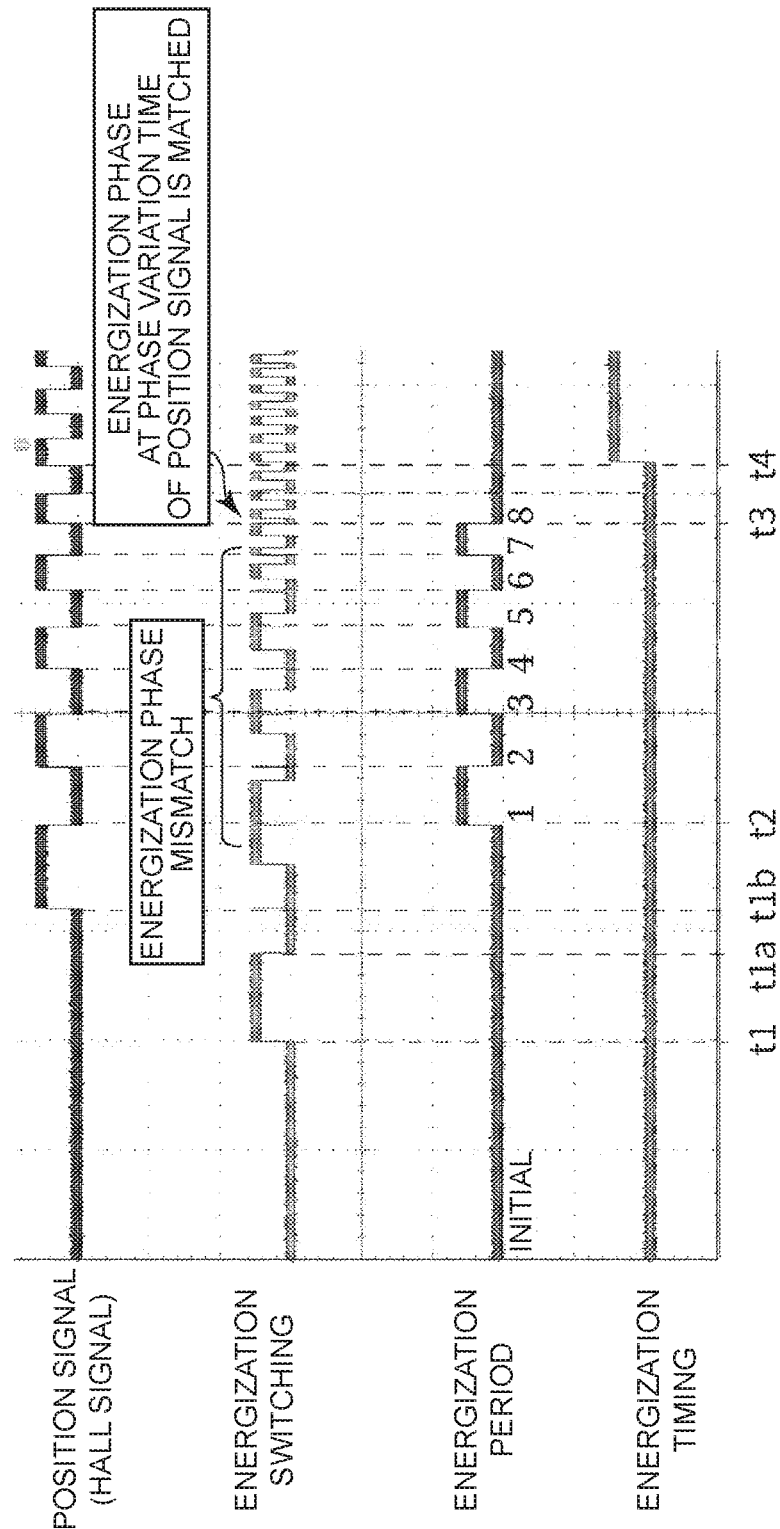
FIG. 11 is a timing chart showing the operation of a control circuit unit when a synchronous motor is activated.

FIG. 11 is a timing chart showing the operation of the control circuit unit 3 when the synchronous motor 10 is activated.

FIG. 11 shows a waveform example of the position signal, and waveform examples representing the respective operations of the energization switching, the energization period, and the energization timing from the upper stage. In the waveform of the energization switching the high level and the low level are switched to each other every time an electrical angle of 60 degrees has passed. In the waveform of the energization period the high level and the low level are switched to each other every time the processing of shortening the period T1 (the processing of the step S34 of the third processing) is executed. The values from "initial" to "8" represented along the waveform of the energization period represent the times set as the period T1 based on the example of FIG. 10. In the waveform of the energization timing the high level and the low level are switched to each other when the activation of the synchronous motor 10 has been completed and the normal driving after the activation is started.

When the activation is started, the second processing is started at the time t1 to start energization. The period T1 at this time is the "initial" period shown in FIG. 10. In the example of FIG. 11, the position signal is set to the low level, for example.

When the energization is started at the time t1, the energization phase is switched every time the period T1 has elapsed. That is, the energization phase is switched at a time t1a when the period T1 has elapsed from the time t1. At this time, the energization is performed with a switched energization phase for only the period T1 again.

When the rotor rotates and the position signal rises from the low level to the high level at a time t1b, the energization phase is switched to the fourth energization phase (4) corresponding to the rising. The energization is performed with the switched energization phase with no interruption. Subsequently, when the period T1 has elapsed from the time t1a, the energization phase is switched to the next fifth energization phase (5). In the example shown in FIG. 11, the period T1 is not changed at a timing where the phase of the position signal first varies as described above. However, the period T1 may be changed to the time of "1" shortened from the "initial" time at this timing.

Subsequently, the position signal falls from the high level to the low level at a time t2. At this time, the energization phase is the fifth energization phase (5), and it is different from the first energization phase (1) corresponding to the falling of the position signal. Therefore, the energization phase is switched to the first energization phase (1). Furthermore, the period T1 is changed to the time of "1" from the "initial" time. As a result, the energization period is shortened.

Subsequently, every time the rising or falling of the position signal occurs, the energization phase is switched to the fourth energization phase (4) or the first energization phase (1) according to which one of the rising or the falling is detected when the energization phase is not matched. Furthermore, the period T1 is successively changed to a shorter time.

Subsequently, at a time t3, the position signal rises from the low level to the high level, the energization phase is switched to the fourth energization phase (4), and the period T1 is changed from the time of "7" to the time of "8". Subsequently, since the energization phase when the falling of the position signal is detected is the first energization phase (1) corresponding to the falling, the switching of the energization phase is not performed. Since the energization phase (at a time t4) when the rising of the position signal is next detected is the fourth energization phase (4) corresponding to the rising, it is determined at that time point that the energization phase is synchronized. As a result, the energization timing adjustment is finished, and the normal driving of the synchronous motor 10 based on the single-sensor method after activation is started.

When the variation timing of the phase of the position signal and the energization phase are not matched with each other after the activation of the synchronous motor 10, the control circuit unit 3 adjusts the energization phase based on the position signal to match the variation timing of the phase of the position signal and the energization phase. That is, at the timing where the rising or falling of the position signal is detected, the control circuit unit 3 switches the energization phase to the first energization phase (1) or the fourth energization phase (4) corresponding to the detected rising or falling. As a result, even when the rotation phase of the rotor is disturbed with respect to the energization phase, the rotor can be restored to be normally driven.

As described above, in the present embodiment, when the synchronous motor 10 is activated, the variation timing of the phase of the position signal and the energization phase can be matched with each other by performing the energization timing adjustment, whereby the rotational position of the rotor and the energization phase can be synchronized with each other. Therefore, the synchronous motor 10 can be properly activated. The energization phase and the variation timing of the phase of the position signal can be quickly matched with each other without providing any step of positioning the rotor (rotor lock), and the synchronous motor 10 can be quickly activated.

When the synchronous motor 10 is activated, a time longer than the period of switching the phase of the position signal is set to an initial energization time of each energization phase, and thereafter the energization time is gradually shortened until synchronization is established. Therefore, the commutation period of the energization phase is shortened in conformity with the acceleration of the rotation (activation from a low speed to a high speed) of the synchronous motor 10, whereby the probability that step-out occurs until synchronization is established can be reduced. Accordingly, the synchronous motor 10 can be surely activated. Since electromagnetic noise under the activation can be reduced, the synchronous motor 10 can be activated quietly. Since a predetermined period is set without measuring the period of the position signal under the activation to perform energization, the energization phase and the rotational position of the rotor can be surely synchronized with each other without occurrence of step-out even when the rotor rotates from reverse rotation to forward rotation.

The method of adjusting the energization phase to a corresponding energization phase when the energization phase at the variation timing of the phase of the position signal is shifted at the execution time of the energization timing adjustment is not limited to the method of successively advancing the energization phase as described above.

Figure 12:
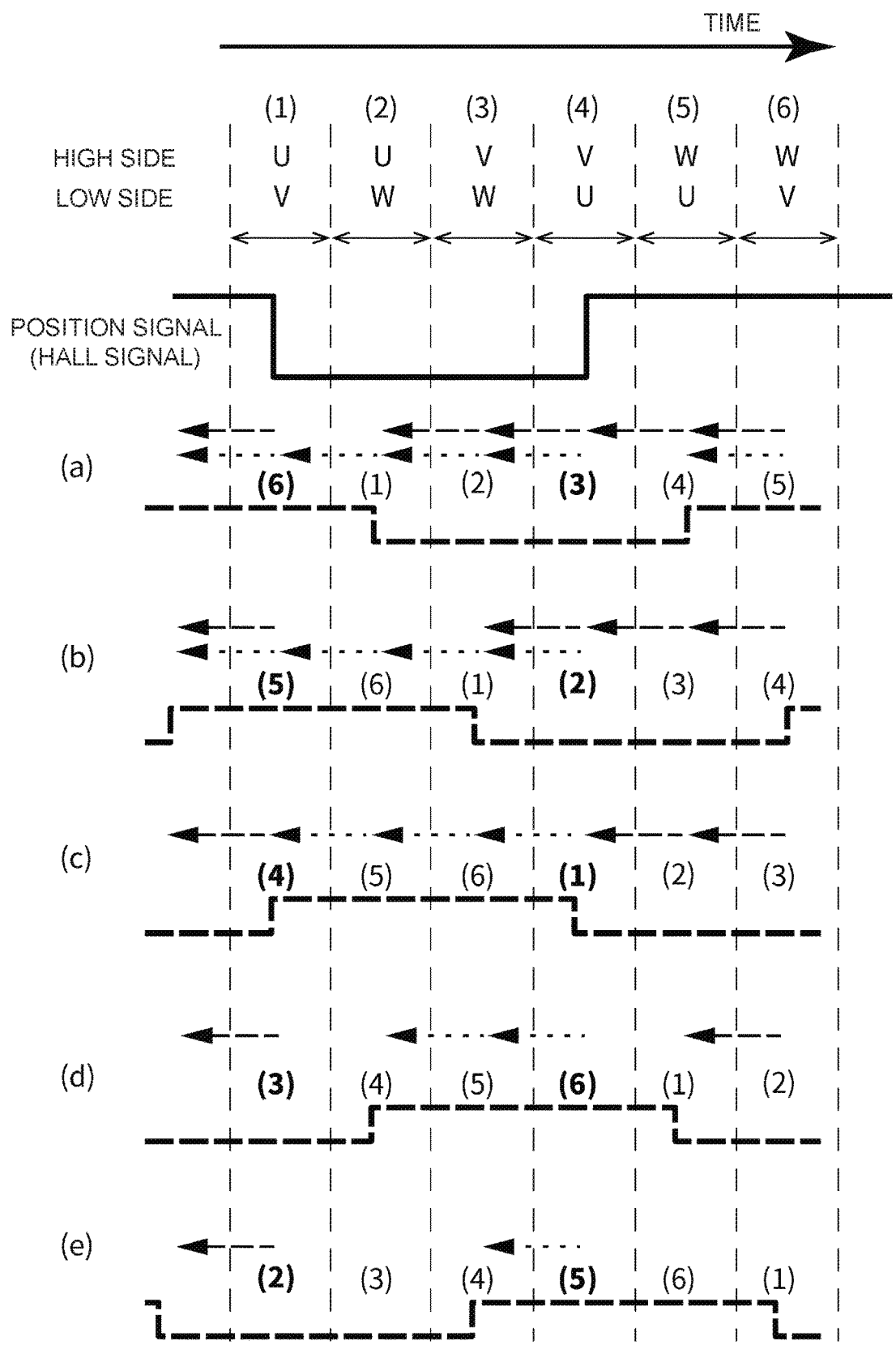
FIG. 12 is a timing chart showing a modification of the present embodiment.

FIG. 12 is a timing chart showing one modification of the present embodiment.

FIG. 12 is illustrated in the same style as FIG. 3 of the above-mentioned embodiment. In the present modification, when adjusting the energization phase, the energization timing adjusting unit 32 switches the current energization phase till an expected energization phase according to a predetermined time so as to delay the energization phase.

In the present modification, the energization phase is switched to the previous energization phase in a predetermined order at an earlier timing than usual, whereby the energization phase is switched till an expected energization phase. As shown in FIG. 12, when the energization phase at the detection time of the falling is the second energization phase (2) as in the case (e), the energization phase is returned by one to be switched to the first energization phase (1) (see an arrow of broken line). When the energization phase at the detection time of the rising is the fifth energization phase (5), the energization phase is returned by one to be switched to the fourth energization phase (4) (see an arrow of dotted line). Likewise, the energization phase is returned by two in the case (d), the energization phase is returned by three in the case (c), the energization phase is returned by four in the case (b), and the energization phase is returned by five in the case (a). As a result, when the falling is detected, the energization phase is adjusted to the first energization phase (1) corresponding to the falling (see an arrow of broken line). When the rising is detected, the energization phase is adjusted to the fourth energization phase (4) corresponding to the falling (see an arrow of dotted line).

In the present modification, the same effect as the above-mentioned embodiment can be also obtained.

Figure 13:
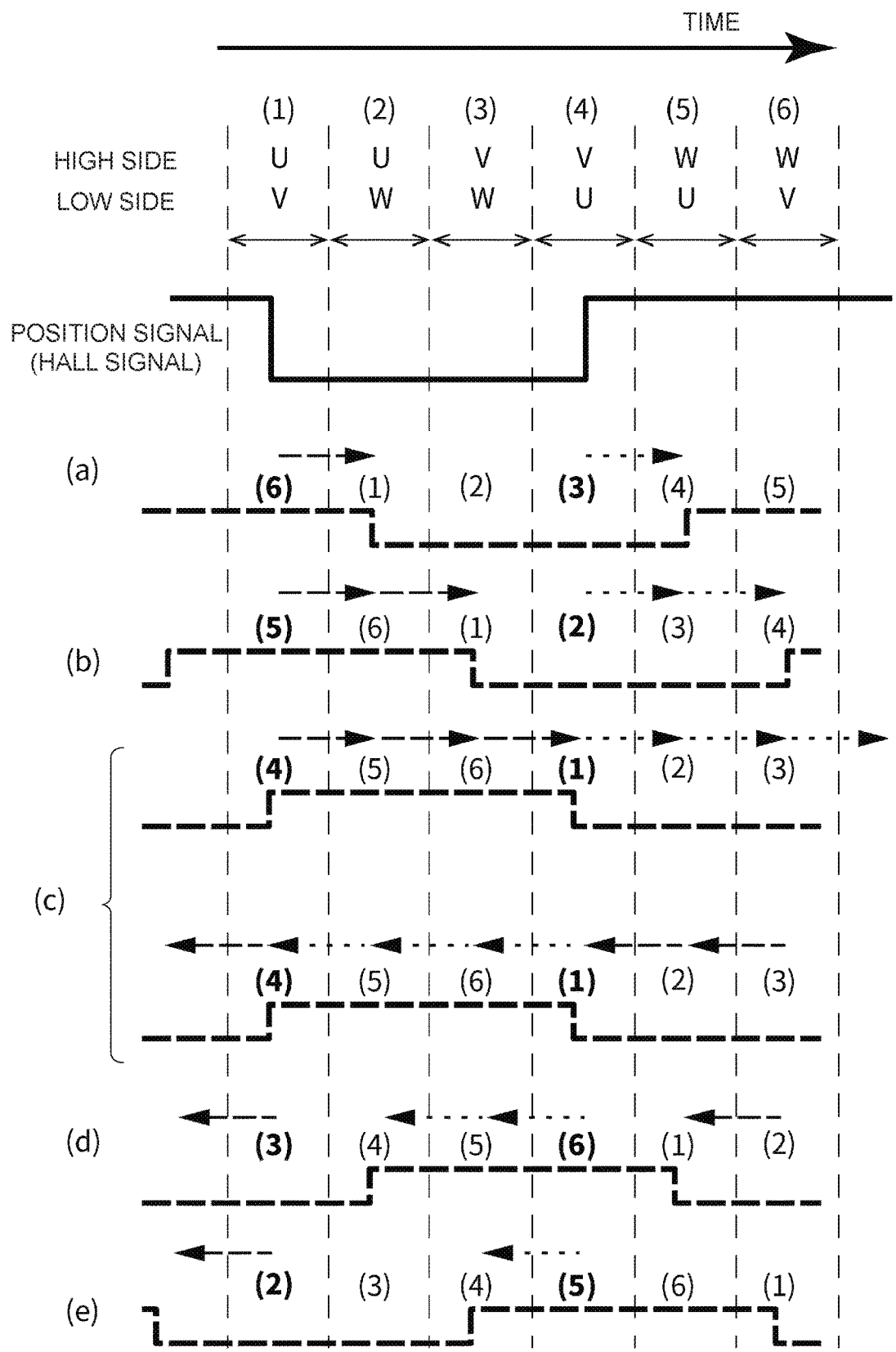
FIG. 13 is a timing chart showing another modification of the present embodiment.

FIG. 13 is a timing chart showing another modification of the present embodiment.

FIG. 13 is also illustrated in the same style as FIG. 3 of the above-mentioned embodiment. The present modification differs in that when adjusting the energization phase, the energization timing adjusting unit 32 advances or delays the energization phase in a predetermined order according to the difference between the current energization phase and an expected energization phase.

That is, in the present modification, when the number of advancing the energization phase until the energization phase reaches an expected energization phase is less with respect to the current energization phase, the energization phase is advanced. That is, as shown in FIG. 13, in both case (a) and case (b), the energization phase is advanced to be adjusted to an expected energization phase because the number of times the energization phase is switched is less in advancing the energization phase than the number in returning the energization phase. Specifically, the energization phase can be set to the expected energization phase by advancing the energization phase only once (in the case (a)) or only twice (in the case (b)).

On the other hand, when the number of returning the energization phase until the energization phase reaches an expected energization phase is less with respect to the current energization phase, the energization phase is returned. In both the case (d) and the case (e), the energization phase is returned to be adjusted to an expected energization phase because the number of times the energization phase is switched is less in returning the energization phase than the number in advancing the energization phase. Specifically, the energization phase can be set to the expected energization phase by returning the energization phase only once (in the case (e)) or only twice (in the case (d)).

In the present modification, in the case of the case (c), the number of advancing the energization phase till the expected energization phase and the number of returning the energization phase till the expected energization phase are equal to 3, and thus equal to each other. That is, in the case of the case (c), the energization phase may be advance or returned.

As described above, in the present modification, the number of times the energization phase is switched can be reduced.

[Others]

The motor driving control device is not limited to the circuit configurations as shown in the above-mentioned embodiments and the modifications. Various circuit configurations configured to be matched with the purpose of the present disclosure can be applied.

For example, the arrangement position of the positon detector is not limited. That is, the relationship between the variation timing of the phase of the position signal and the corresponding energization phase is not limited to that of the above-mentioned embodiment.

In the activation of the motor of the above-mentioned embodiment, the energization phase is switched to a matched energization phase both in the case where the rising of the position signal is detected and in the case where the falling of the position signal is detected, however, the present disclosure is not limited to this style. The energization phase may be switched to a matched energization phase in one of the cases where the rising of the position signal is detected and the case where the falling of the position signal is detected.

Furthermore, the above-mentioned embodiment is described under the condition that the switching element constituting the inverter circuit 2 is MOSFET. However, the switching element is not limited to MOSFET, and may be a bipolar transistor or the like.

The motor to be driven by the motor driving control device according to the present embodiment is not limited to a three-phase brushless motor, and may be one of various motors having coils of plural phases of two or more phases. Furthermore, a motor for detecting the rotational number of a motor by an FG sensor or the like, etc. may be driving targets to be controlled by the motor driving control device.

The above-mentioned flowcharts, etc. are examples for describing the operation, and the present disclosure is not limited to these flowcharts, etc. The steps shown in the respective illustrations of the flowcharts are specific examples, and the present disclosure is not limited to the flow of these steps. For example, the order of the respective steps may be changed, other processing may be inserted between the steps, or the processing may be parallelized.

Some or all parts of the processing in the above-mentioned embodiment may be executed by software or by using hardware circuits. For example, the controller is not limited to a microcomputer. The internal configuration of the controller may be at least partially processed by software.

It should be considered that the description on the above-mentioned embodiment is exemplary in all points, and not restrictive. The scope of the present disclosure is expressed not based on the foregoing description, but based on the scope of claims, and is intended to encompass all alterations within meanings and ranges equivalent to the scope of claims.

What is claimed is:

1. A motor driving control device comprising:
   a motor driving unit for selectively energizing coils of a plurality of phases of a motor;
   a control circuit unit for outputting a driving control signal to the motor driving unit to switch, in a predetermined order, an energization phase of the coils of the plurality of phases to be energized by the motor driving unit; and
   a position detector for outputting a position signal corresponding to a position of a rotor of the motor, wherein
   the control circuit unit adjusts the energization phase based on the position signal when the motor is activated, thereby matching variation timing of a phase of the position signal and the energization phase with each other, and outputs the driving control signal according to a period of the position signal after the activation of the motor.

2. The motor driving control device according to claim 1, wherein when the motor is activated, the control circuit unit quickly switches the energization phase in the predetermined order to adjust the energization phase.

3. The motor driving control device according to claim 1, wherein when the motor is activated, the control circuit unit starts a switching operation of the energization phase in a period longer than the period of the position signal, and then shortens the period of performing the switching operation of the energization phase every time a predetermined condition is satisfied.

4. The motor driving control device according to claim 3, wherein when the motor is activated, the control circuit unit stops an operation for shortening the period of performing the switching operation of the energization phase when the variation timing of the phase of the position signal and the energization phase are matched with each other.

5. The motor driving control device according to claiml, wherein when the variation timing of the phase of the position signal and the energization phase are not matched with each other after the activation of the motor, the control circuit unit adjusts the energization phase based on the position signal to match the variation timing of the phase of the position signal and the energization phase with each other.

6. A method for controlling driving of a motor, wherein the motor comprises:
   a motor driving unit for selectively energizing coils of a plurality of phases of a motor;
   a control circuit unit for outputting a driving control signal to the motor driving unit to switch, in a predetermined order, an energization phase of the coils of the plurality of phases to be energized by the motor driving unit; and
   a position detector for outputting a position signal corresponding to a position of a rotor of the motor, wherein the method comprises:
   a first step of adjusting the energization phase based on the position signal to match variation timing of a phase of the position signal and the energization phase with each other when the motor is activated; and
   a second step of outputting the driving control signal according to a period of the position signal after the activation of the motor in the first step.

* * * * *